(12) United States Patent
York

(10) Patent No.: US 7,333,776 B1
(45) Date of Patent: Feb. 19, 2008

(54) PHONE ALERT

(76) Inventor: Joseph York, 801 Jupiter Rd., Suite 100, Plano, TX (US) 75074

( * ) Notice: Subject to any disclaimer, the term of this patent is extended or adjusted under 35 U.S.C. 154(b) by 742 days.

(21) Appl. No.: 10/810,870

(22) Filed: Mar. 25, 2004

(51) Int. Cl.
*H04B 1/38* (2006.01)

(52) U.S. Cl. .................... 455/90.1; 455/90.3; 455/410; 455/421; 455/575.1; 455/550.1; 340/539.23; 340/571; 340/568.1; 340/815.4; 340/825.36; 340/384.1

(58) Field of Classification Search ................ 455/88, 455/90.1, 90.3, 41.3, 41.2, 410, 411, 348, 455/349, 351, 421, 567, 575.1, 100, 550.1, 455/517, 566, 556.1, 556.2, 552.1, 553.1, 455/572, 352; 340/539.23, 539.1, 571, 572.8, 340/568.1, 815.4, 825.36, 825.49, 384.1
See application file for complete search history.

(56) References Cited

U.S. PATENT DOCUMENTS

| | | | |
|---|---|---|---|
| 5,635,897 A | 6/1997 | Kuo | |
| 5,781,109 A | 7/1998 | Nakajima | |
| 5,796,338 A | 8/1998 | Mardirossian | |
| 6,151,493 A * | 11/2000 | Sasakura et al. | 455/421 |
| 6,154,665 A * | 11/2000 | Briffett et al. | 455/574 |
| 6,674,364 B1 * | 1/2004 | Holbrook et al. | 340/568.1 |
| 6,816,070 B1 * | 11/2004 | Hsu et al. | 340/539.21 |
| 6,885,848 B2 * | 4/2005 | Lee | 455/41.2 |
| 6,956,480 B2 * | 10/2005 | Jespersen | 340/568.1 |
| 7,009,512 B2 * | 3/2006 | Cordoba | 340/539.23 |
| 2003/0011478 A1 * | 1/2003 | Rabanne et al. | 340/573.4 |

* cited by examiner

*Primary Examiner*—Matthew D. Anderson
*Assistant Examiner*—Sujatha Sharma

(57) ABSTRACT

A type of cellular phone notification apparatus is disclosed. The apparatus would combine both a transmitter attached to a cellular phone and a receiver that would be attached to an individual's clothing. If the cellular phone and the receiver would become disassociated more than a specified number of feet, the receiver would notify the individual of this fact so that the cellular phone could be retrieved, if necessary.

6 Claims, 2 Drawing Sheets

PHONE ALERT

I. BACKGROUND OF THE INVENTION

The present invention concerns that of a new and improved type of type of cellular phone notification apparatus.

II. DESCRIPTION OF THE PRIOR ART

U.S. Pat. No. 5,635,897, issued to Kuo, discloses a two-part system with one component attached to a cellular telephone and capable of transmitting a verification signal to a user carried device that is capable of providing an alert if a pre-determined separation distance is reached.

U.S. Pat. No. 5,781,109, issued to Nakajima, discloses an alarm system for preventing the loss of personal property such as a wallet, purse, card, bag or umbrella U.S. Pat. No. 5,796,338, issued to Mardirossian, discloses a system for preventing the loss of a cellular telephone, capable of sending a signal to a pager that is worn by a user and suited to provide an alert if a separation distance is reached.

III. SUMMARY OF THE INVENTION

The present invention concerns that of a new and improved type of type of cellular phone notification apparatus. The apparatus would combine both a transmitter attached to a cellular phone and a receiver that would be attached to an individual's clothing. If the cellular phone and the receiver would become disassociated more than a specified number of feet, the receiver would notify the individual of this fact so that the cellular phone could be retrieved, if necessary.

There has thus been outlined, rather broadly, the more important features of a cellular phone notification apparatus that the detailed description thereof that follows may be better understood and in order that the present contribution to the art may be better appreciated. There are, of course, additional features of the cellular phone notification apparatus that will be described hereinafter and which will form the subject matter of the claims appended hereto.

In this respect, before explaining at least one embodiment of the cellular phone notification apparatus in detail, it is to be understood that the cellular phone notification apparatus is not limited in its application to the details of construction and to the arrangements of the components set forth in the following description or illustrated in the drawings. The cellular phone notification apparatus is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present cellular phone notification apparatus. It is important, therefore, that the claims be regarded as including such equivalent constructions insofar as they do not depart from the spirit and scope of the present invention.

It is therefore an object of the present invention to provide a cellular phone notification apparatus which has all of the advantages of the prior art and none of the disadvantages.

It is another object of the present invention to provide a cellular phone notification apparatus which may be easily and efficiently manufactured and marketed.

It is another object of the present invention to provide a cellular phone notification apparatus which is of durable and reliable construction.

It is yet another object of the present invention to provide a cellular phone notification apparatus which is economically affordable and available for relevant market segment of the purchasing public.

Other objects, features and advantages of the present invention will become more readily apparent from the following detailed description of the preferred embodiment when considered with the attached drawings and appended claims.

IV. BRIEF DESCRIPTION OF THE DRAWINGS

V. DESCRIPTION OF THE PREFERRED EMBODIMENT

Priority is hereby claimed to application 60/458,806, filed on Mar. 31, 2003.

Figure 1:
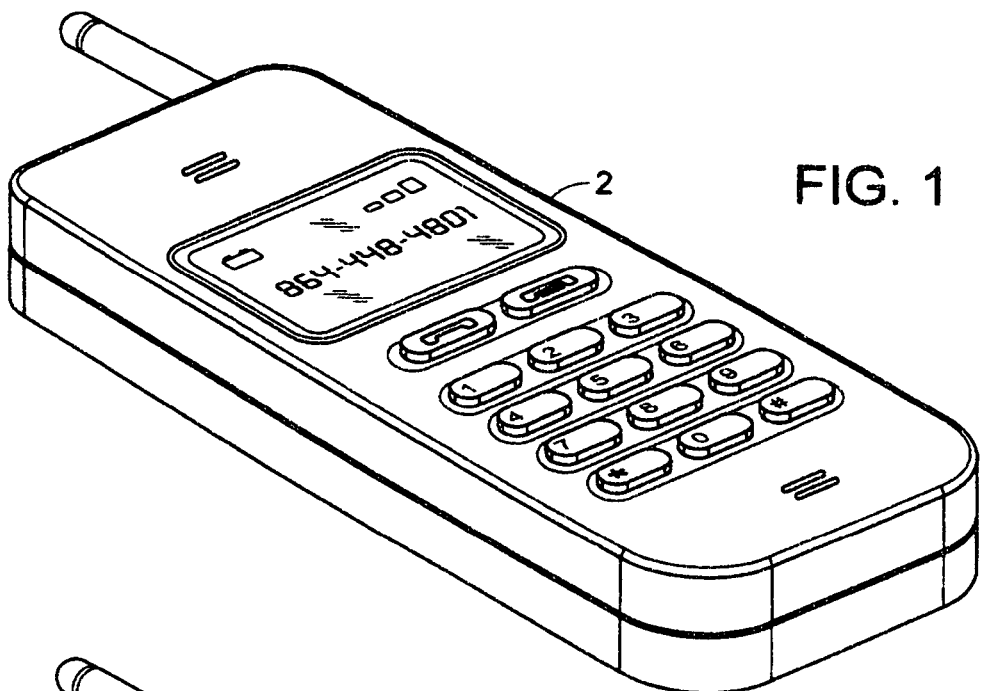
FIG. 1 shows a perspective representational view of a cellular phone used in conjunction with the invention.
Figure 2:
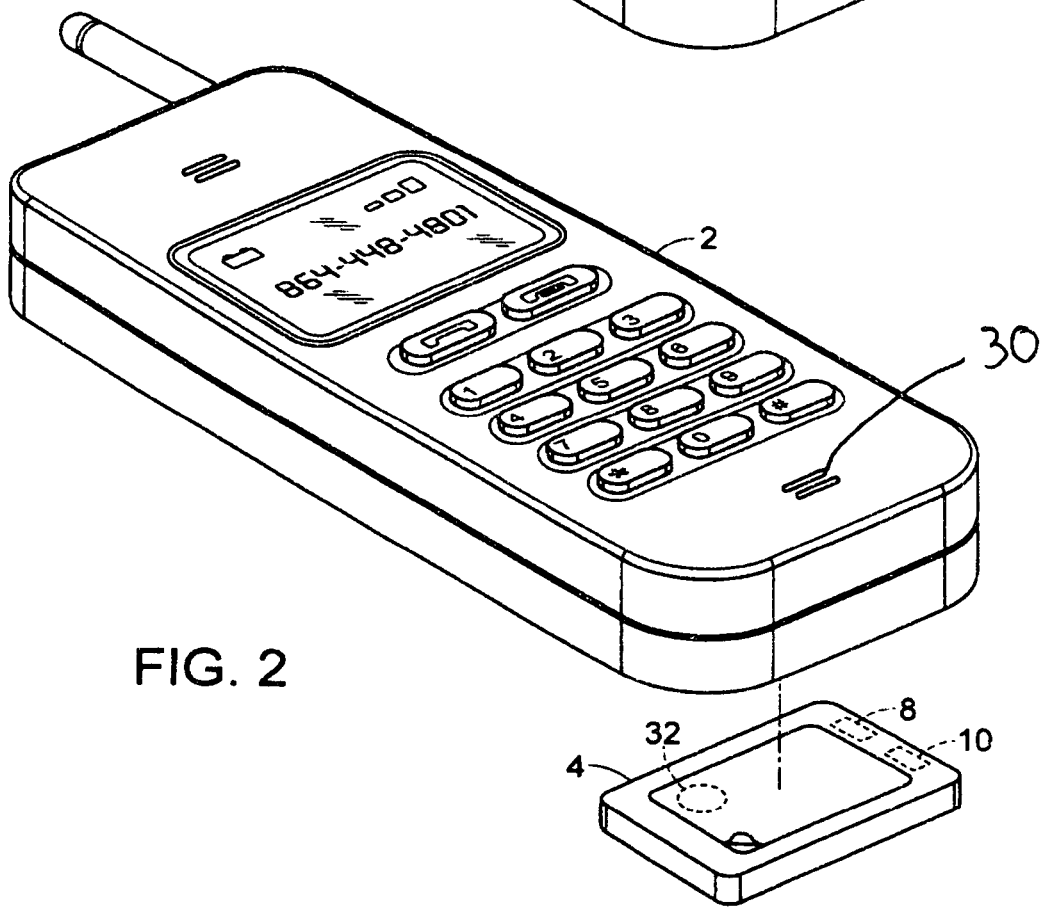
FIG. 2 shows a perspective representational view of a transmitter used in conjunction with the cellular phone.
Figure 3:
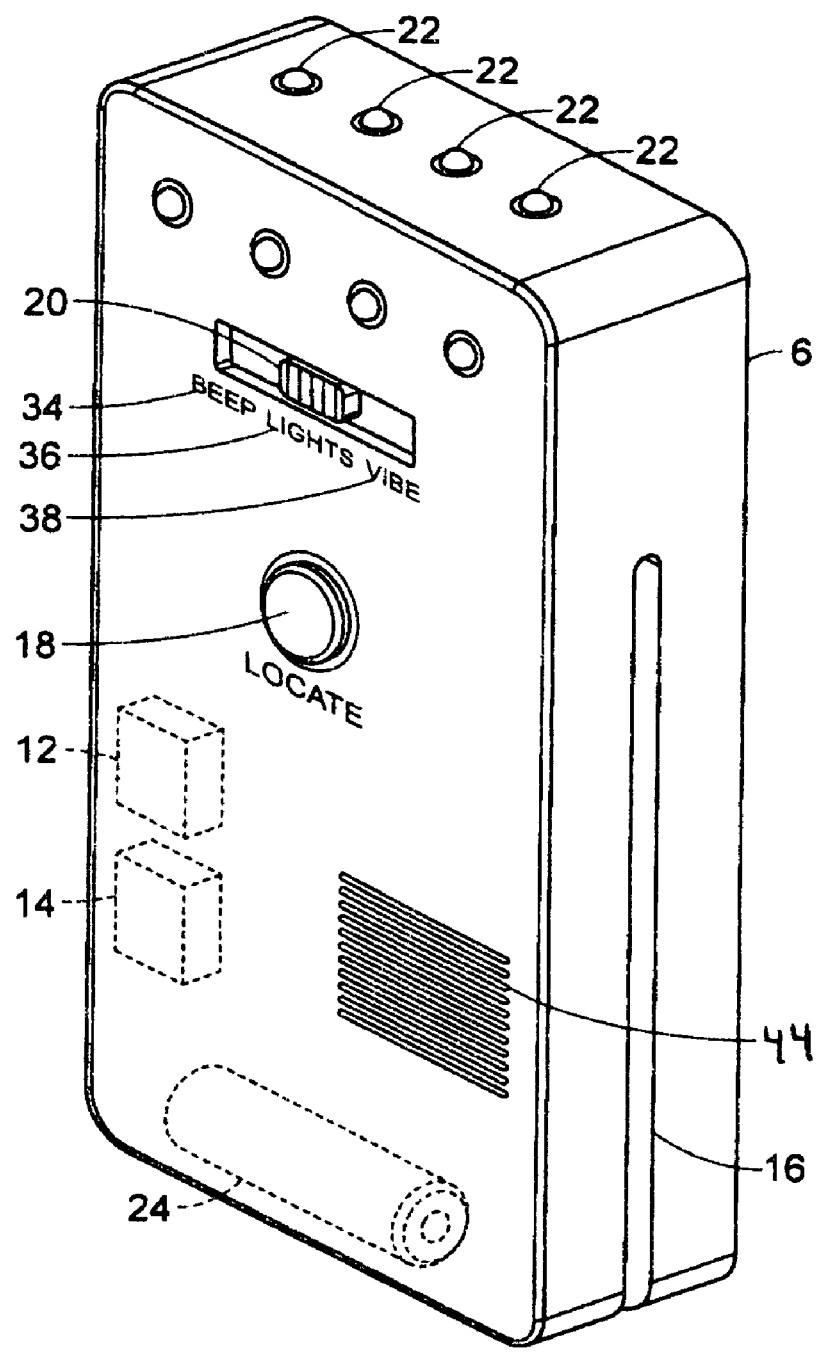
FIG. 3 shows a perspective representational view of a receiver used in conjunction with the present invention.

FIG. 1 shows a perspective representational view of a cellular phone 2 used in conjunction with the invention, while FIG. 2 shows a perspective representational view of a transmitter 4 used in conjunction with the cellular phone 2. Further, FIG. 3 shows a perspective representational view of a receiver 6 used in conjunction with the present invention. The cellular phone 2 has two surfaces, a front surface and a rear surface.

The present invention would be a system designed to prevent people from leaving behind their cellular phones in doctor's offices, taxis, rental cars, hotel rooms, or other locations where they might accidentally be left. Transmitter 4 is attached to the rear surface of the cellular phone 2 and has an incorporated radio wave transmitter 8 and a radio wave receiver 10. The radio wave transmitter 8 portion of transmitter 4 continually emits radio waves of a specific frequency and strength. These radio waves are picked up a radio wave receiver 12 that is located within receiver 6. Receiver 6 also includes an incorporated radio wave transmitter 14.

As seen in FIG. 3, receiver 6 has a slot 16 that can be used to removably attach receiver 6 to an individual's pants pocket, shirt, belt, or other item of clothing. Furthermore, receiver 6 has locate button 18, switch 20, and a plurality of lights 22. Receiver 6 preferably is powered via power means 24, preferably an incorporated battery.

The radio wave receiver 12 within receiver 6 is designed to pick up and recognize radio waves emitted from the radio wave transmitter 8 within transmitter 4. As long as the waves being received by radio wave receiver 12 are of a certain strength, receiver 6 will not make any noise. However, if receiver 6 and cellular phone 2 become more than twenty to thirty feet apart in distance, the strength of radio waves being received by radio wave receiver 12 within receiver 6 will fall below a specified threshold, and then, receiver 6 will proceed to emit sounds through speaker 44. This, in turn, will notify an individual that he or she may have left their cellular phone 2 behind, allowing them to immediately retrieve it if necessary.

The presence of locate button 18 on receiver 6 will also allow a user to independently locate the cellular phone 2. If locate button 18 is pressed, then radio wave transmitter 14 within receiver 6 will send out radio waves. If radio wave receiver 10 of transmitter 4 is within range, it will receive and recognize said radio waves. Then, it will emit sounds through an attached speaker 30 on the cellular phone 2. Transmitter 4 itself would preferably be powered via power means 32, preferably an incorporated battery.

Switch 20 is located on the receiver 6 and is a three-position switch that has three settings: beep 34, lights 36, and vibrate 38. By placing the switch 20 in the beep 34 position, the receiver 6 would make noise, as previously described herein. If switch 20 was in the lights 36 position, then the plurality of lights 22 would make blink instead of make noise. If switch 20 was in the vibrate 38 position, then the receiver 6 would vibrate instead of make noise.

What I claim as my invention is:

1. A cellular phone notification apparatus comprising:
   a cellular phone, the cellular phone having a front surface and a rear surface,
   a transmitter unit connected to the rear surface of the cellular phone, the transmitter unit having an incorporated radio wave transmitter that continually emits radio waves of a specific frequency and strength, the transmitter unit also having an incorporated radio wave receiver,
   power means for providing power to the transmitter unit,
   a receiver unit, the receiver unit having an incorporated radio wave transmitter, the receiver unit also having an incorporated radio wave receiver, the receiver unit having a plurality of notification mechanisms,
   power means for providing power to the receiving unit,
   a speaker incorporated into the receiver unit,
   a plurality of lights attached to the receiver unit,
   means for locating the cellular phone through the receiver unit,
   means for attaching the receiver unit to an item of clothing being worn by an individual,
   a mechanism attached to the receiver unit, the mechanism including a plurality of notification settings, the mechanism allowing an individual to alternatingly choose one of the plurality of notification settings at any particular time, each notification setting designed to correlate with a particular notification mechanism, wherein the mechanism attached to the receiver unit is a three-position switch, the three-position switch having three separate positions, one of the positions being a "beep mode," another one of the positions being a "light mode," and the third position being a "vibrate mode," each of the three positions corresponding to a notification mechanism of the receiver unit,
   wherein the incorporated radio wave receiver on the receiver unit continually receives the radio waves emitted from the radio wave transmitter in the transmitter unit, further wherein the incorporated radio wave receiver on the receiver unit is capable of measuring distance between the receiver unit and the transmitter unit based on the strength of the radio waves, and further wherein the incorporated radio wave receiver on the receiver unit will activate at least one notification mechanism.

2. A cellular phone notification apparatus according to claim 1 wherein the means for attaching the receiver unit to an item of clothing being worn by an individual further comprises a slot, the slot allowing placement of the receiving unit to an item of clothing being worn by an individual.

3. A cellular phone notification apparatus according to claim 1 wherein the means for locating the cellular phone through the receiver unit further comprises:
   a locate button located on the receiver unit,
   wherein depressing the locate button activates the radio wave transmitter on the receiving unit, causing it to send out radio waves,
   further wherein the radio wave receiver on the transmitter unit will receive the radio waves from the radio wave transmitter on the receiver unit if it is within a pre-set range,
   further wherein the radio wave receiver on the transmitter unit activates the speaker on the transmitter unit and cause it to make sounds, thereby alerting an individual as to its location.

4. A cellular phone notification apparatus according to claim 1 wherein the three-position switch, when in the "beep mode" position, will activate a notification mechanism in the receiver unit that causes continuous beeping when the radio wave receiver on the receiver unit is activated.

5. A cellular phone notification apparatus according to claim 1 wherein the three-position switch, when in the "light mode" position, will activate a notification mechanism in the receiver unit that causes the plurality of lights to continually blink on and off when the radio wave receiver on the receiver unit is activated.

6. A cellular phone notification apparatus according to claim 1 wherein the three-position switch, when in the "vibrate mode" position, will activate a notification mechanism in the receiver unit that causes continuous vibration of the receiver unit when the radio wave receiver on the receiver unit is activated.

* * * * *